United States Patent
Panotopoulos et al.

(10) Patent No.: US 10,578,804 B2
(45) Date of Patent: Mar. 3, 2020

(54) OPTICAL SLAB

(71) Applicant: HEWLETT PACKARD ENTERPRISE DEVELOPMENT LP, Houston, TX (US)

(72) Inventors: Georgios Panotopoulos, Berkeley, CA (US); Michael Renne Ty Tan, Menlo Park, CA (US); Wayne Victor Sorin, Mountain View, CA (US); David A. Fattal, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/175,766

(22) Filed: Oct. 30, 2018

(65) Prior Publication Data

US 2019/0064442 A1 Feb. 28, 2019

Related U.S. Application Data

(63) Continuation of application No. 14/373,400, filed as application No. PCT/US2012/035157 on Apr. 26, 2012, now Pat. No. 10,162,116.

(51) Int. Cl.
*G02B 6/293* (2006.01)
*G02B 6/12* (2006.01)
(Continued)

(52) U.S. Cl.
CPC ..... *G02B 6/29367* (2013.01); *G02B 6/12004* (2013.01); *G02B 6/2938* (2013.01);
(Continued)

(58) Field of Classification Search
CPC ...... G02B 6/12004; G02B 6/124; G02B 6/13; G02B 6/14; G02B 6/29311;
(Continued)

(56) References Cited

U.S. PATENT DOCUMENTS 5,343,542 A 8/1994 Kash et al.
5,345,524 A 9/1994 Lebby et al.
(Continued)

FOREIGN PATENT DOCUMENTS

JP 2005-017811 A 1/2005
JP 2005-504324 A 2/2005
(Continued)

OTHER PUBLICATIONS

Schow, C.L. et al., A Single-chip CMOS-based Parallel Optical Transceiver Capable of 240-Gb/s Bidirectional Data Rates, (Research Paper), Apr. 1, 2009, Journal of Lightwave Technology, vol. 27, No. 7, pp. 915-929.
(Continued)

*Primary Examiner* — Michael P Mooney
(74) *Attorney, Agent, or Firm* — Hewlett Packard Enterprise Patent Department (57) ABSTRACT

An apparatus (2) can comprise an optical slab (4) comprising a rigid substrate of substantially transmissive material. The apparatus (2) can also comprise a WDM multiplexer (6) to receive and combine a plurality of optical signals (14, 16 and 20) at different wavelengths to form a combined optical signal (24) in the optical slab (4) having an aggregate power. The apparatus can further comprise a broadcaster (28) to distribute the combined optical signal (24) from the optical slab (4) to each of a plurality of different optical receivers (30, 32 and 34) with a fraction of the aggregate power of the combined optical signal (24).

17 Claims, 9 Drawing Sheets

(51) Int. Cl.
*G02B 6/43* (2006.01)
*H04B 10/60* (2013.01)
*H04J 14/02* (2006.01)
*G02B 6/42* (2006.01)

(52) U.S. Cl.
CPC ............ *G02B 6/29311* (2013.01); *G02B 6/43* (2013.01); *H04B 10/60* (2013.01); *H04J 14/02* (2013.01); *G02B 6/4214* (2013.01); *G02B 6/4215* (2013.01)

(58) Field of Classification Search
CPC .... G02B 6/29367; G02B 6/2938; G02B 6/32; G02B 6/42; G02B 6/4204; G02B 6/4214; G02B 6/4215; G02B 6/423; G02B 6/4232; G02B 6/425; G02B 6/4249; G02B 6/4269; G02B 6/428; G02B 6/43; H04J 14/02; H04J 14/0278; H04B 10/60
USPC .. 385/14, 24, 27–28, 31, 37, 39, 46, 47, 49, 385/51–52, 122–123, 129–130, 146
See application file for complete search history.

(56) References Cited

U.S. PATENT DOCUMENTS

| | | | |
|---|---|---|---|
| 5,894,535 | A | 4/1999 | Lemoff et al. |
| 6,236,778 | B1 | 5/2001 | Laughlin |
| 6,332,050 | B1 | 12/2001 | Feldman et al. |
| 6,563,976 | B1 | 5/2003 | Grann et al. |
| 6,768,834 | B1 | 7/2004 | Gruhlke |
| 7,184,621 | B1 | 2/2007 | Zhu |
| 8,036,533 | B2 | 10/2011 | Hosomi et al. |
| 2002/0003922 | A1* | 1/2002 | Takano ............ G02B 6/29367 385/24 |
| 2002/0021855 | A1 | 2/2002 | Kim |
| 2002/0191900 | A1 | 12/2002 | Hoffmann et al. |
| 2003/0099018 | A1 | 5/2003 | Singh et al. |
| 2004/0175069 | A1 | 9/2004 | Zami |
| 2005/0018951 | A1 | 1/2005 | Mossberg et al. |
| 2007/0160321 | A1 | 7/2007 | Wu et al. |
| 2007/0230871 | A1 | 10/2007 | Bidnyk et al. |
| 2008/0089684 | A1 | 4/2008 | Smith et al. |
| 2008/0193134 | A1 | 8/2008 | Ranalli |
| 2008/0198570 | A1 | 8/2008 | Hatanaka et al. |
| 2009/0002928 | A1 | 1/2009 | Murakami |
| 2012/0093462 | A1 | 4/2012 | Childers et al. |
| 2013/0216180 | A1* | 8/2013 | Tan .................... G02B 6/29367 385/24 |
| 2014/0226934 | A1* | 8/2014 | Panotopoulos ...... G02B 6/4231 385/48 |

FOREIGN PATENT DOCUMENTS

| | | |
|---|---|---|
| JP | 2010-203838 A | 9/2010 |
| KR | 10-1001277 B1 | 12/2010 |
| WO | 2002/075999 A2 | 9/2002 |
| WO | 2007/112548 A1 | 10/2007 |

OTHER PUBLICATIONS

PCT Search Report and Written Opinion, dated Dec. 14, 2012, PCT Patent Application No. PCT/US2012/035157, 9 pages.
International Preliminary Report on Patentability received for PCT Patent Application No. PCT/US2012/035157, dated Nov. 6, 2014, 6 pages.
Extended European Search Report received in EP Application No. 12875430.6, dated Dec. 21, 2015, 10 pages.

* cited by examiner

OPTICAL SLAB

BACKGROUND

In optic communications, wavelength-division multiplexing (WDM) is a technology which multiplexes a number of optical carrier signals onto a single optical signal by using different wavelengths (e.g., colors) of laser light. This technique enables multiplication of capacity and in some instances, reduced cost.

DETAILED DESCRIPTION

Figure 1:
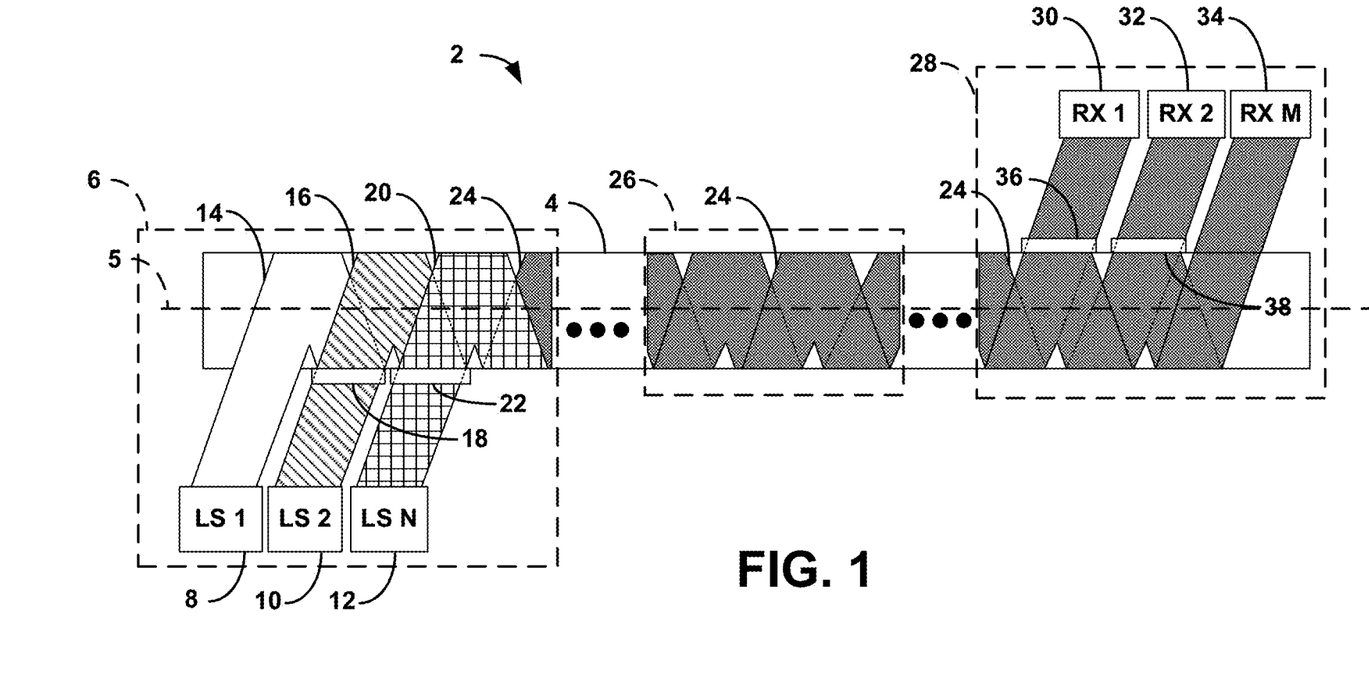
FIG. 1 illustrates an example of an optical engine that combines wave division multiplexing (WDM) with broadcast communication.

FIG. 1 illustrates an example of an optical engine 2 that combines wave division multiplexing with broadcast communication. The optical engine 2 could be employed, for example, in a switch of a data center. In some examples, the optical engine 2 could be employed to facilitate communication between server blades that are mounted on a common rack. The optical engine 2 can include an optical slab 4. The optical slab 4 could be implemented, for example, as a rigid substrate of an optically transmissive material. The optical slab 4 can have a rectangular cross-sectional shape, such as a rectangular prism. The optical slab 4 could be formed, for example, out of glass, plastic or another transmissive and/or transparent material. The optical slab 4 can be coated with a reflective coating, such as a dielectric material or a metal. As discussed herein, specific regions of the optical slab 4 can be free of the reflective material to provide for optical transparency to light.

The optical engine 2 can include a WDM multiplexer 6 that can implement wave division multiplexing (WDM) techniques. The WDM multiplexer 6 multiplexes N number of optical signals onto the optical slab 4 by employing different wavelengths (e.g., different colors) of laser light, where N is an integer greater than one (e.g., 2 or more e.g., up to about 8). The WDM multiplexer 6 can implement for example, coarse wave division multiplexing (CWDM) such as providing a channel spacing between different wavelengths light or about 10 nm or greater.

The WDM multiplexer 6 can receive an optical signal from N number of light sources 8, 10 and 12. Each light source 8, 10 and 12 can include, for example a laser and an optical element (e.g., a lens, a grating or the like). The laser could be implemented, for example, as a vertical-cavity surface-emitting laser (VCSEL). A VCSEL is a type of semiconductor laser diode with laser beam of emission perpendicular from a top surface. Each light source 8, 10 and 12 can provide an optical signal at a specific wavelength. In some examples, each light source 8, 10 and 12 can provide an optical signal with a wavelength between about 800 nm to about 1100 nm. Moreover, each light source 8, 10 and 12 can have a channel spacing of at least 10 nm between adjacent wavelengths.

A first light source 8 can emit a first optical signal 14 into a region of the optical slab 4 that is not coated by the reflective coating. The first optical signal 14 can be transmitted into the optical slab 4 at an acute angle (e.g., about 6° to about 8°), which angle can be referred to as an input angle. It is noted that the thickness of the optical slab 4 can be selected based on the input angle. A second light source 10 can emit a second optical signal 16 that has a wavelength separated from the first optical signal 14 by the channel spacing. The second optical signal 16 can be transmitted into a region of the optical slab 4 that is not coated with the reflective material, but instead is covered with a WDM filter 18 (which can also be referred to as an input filter) associated with the second optical signal 16, such as a dielectric interference filter, a notch filter or the like. The WDM filter 18 associated with the second optical signal 16 transmits light at a wavelength of the second optical signal 16 and reflects other wavelengths. Thus, the WDM filter 18 can be fabricated and positioned on the optical slab 4 to transmit the second optical signal 16 into the optical slab 4 at the input angle and to reflect the first optical signal 14, such that the first and second optical signals 14 and 16 are propagated through the optical slab 4 along an axis 5 of the slab 4. The Nth light source 12 can emit an Nth optical signal 20 that has a wavelength separated from a preceding optical signal (e.g., optical signal N−1) by the channel spacing. The Nth optical signal 20 can be transmitted to a WDM filter 22 associated with the Nth optical signal 20. The WDM filter 22 associated with the Nth optical signal 20 can be similar to the WDM filter 22 associated with the second optical signal 16. That is, the WDM filter 22 associated with the Nth optical signal 20 transmits signals with a wavelength of the Nth optical signal 20 while reflecting other signals (e.g., including the first to N−1 optical signals). Thus, the WDM filter 22 associated with the Nth optical signal 20 can be fabricated and positioned on the optical slab 4 to transmit the Nth optical signal 20 into the optical slab 4 at the input angle and to reflect the first to N−1 optical signals 14, 16 and 20, such that the first to Nth optical signals 14, 16 and 20 are propagated through the optical slab 4. The first to Nth optical signals 14, 16 and 20 can be propagated as a combined optical signal 24 through the optical slab 4 with a zigzag beam shape within the transmissive medium of the optical slab 4.

A propagation region 26 of the optical slab 4 can carry the combined optical signal 24 from the WDM multiplexer 6 to a broadcaster 28 of the optical engine 2 while maintaining the zigzag beam shape for the combined optical signal 24. In one example, the WDM multiplexer 6 can be positioned at one end of the optical slab 4, and the broadcaster 28 can be positioned at an opposing end of the optical slab 4 that is spaced axially (along the axis 5 of the slab 4) apart from the WDM multiplexer 6. In other examples, different arrangements can be employed.

The broadcaster 28 can receive the combined optical signal 24 and distribute the combined optical signal 24 to each of M number of receivers 30, 32 and 34, where M is an integer greater than one (e.g., 2-10). In some examples, the broadcaster 28 of the optical engine 2 can be fabricated such that the combined optical signal is received at a first broadcast filter 36 (which can also be referred to as an output filter) at an output angle, which output angle can be substantially equal to the input angle. The first broadcast filter 36 could be implemented as a dielectric material or a metallic partial reflector, a grating or the like. The first broadcast filter 36 can be configured to transmit the combined optical signal 24 with a fraction of its total aggregate power to a corresponding first receiver 30 of the M number of receivers 30, 32 and 34 and reflect the remaining fraction of power of the combined optical signal 24. The first broadcast filter 36 can be a broadband filter, such as a filter that uniformly operates on at least all of the wavelengths within the combined optical signal 24. In a similar fashion, the fraction of the remaining combined optical signal 24 can be received by a second broadcast filter 38. The second broadcast filter 38 can be configured to transmit another fraction of power of the combined optical signal 24 to a corresponding second receiver 32 of the M number of receivers 30, 32 and 34 and reflect the remaining fraction of power of the combined optical signal 24. The third to M−1 broadcast filters (not shown) can be fabricated and positioned on the optical slab 4 in a similar manner. It is noted that no Mth broadcast filter is needed in some examples. Instead, in some examples, the fraction of power of the combined optical signal 24 remaining after the M−1 broadcast filter can be transmitted from the optical slab 4 to a corresponding Mth receiver 34 of the M number of receivers 30, 32 and 34 at a region of the optical slab 4 that is not covered by the reflective coating. Each of the filters can be configured to control the fractional portion of power that is transmitted to each of the receivers 30, 32 and 34, which can vary depending on the total available power and the number of receivers.

By way of example, the fraction of power of the combined optical receiver received at each of the M number of receivers can be relatively equal. For instance, in one example, the fraction of power of the combined optical signal 24 reflected by the first to M−1 broadcast filters 36 and 38 (broadcast filter X) can be determined from Equation 1:

$$r_x = \frac{M - X}{M + 1 - X} \quad \text{Equation 1}$$

where:

$r_x$, is the fraction (or ratio) of power of the combined optical signal 24 reflected to the Xth receiver by the Xth broadcast filter; and M is the total number of receivers.

Each of the M number of receivers 30, 32 and 34 can be implemented for example, as an interface between mediums. For instance, in some examples, each of the receivers 30, 32 and 34 can include an optical element (e.g., a collimating lens) and a fiber-optic cable such that the combined optical signal 24 received thereby can be transmitted along the fiber-optic cable. In other examples, each of the receivers 30, 32 and 34 can include a photodiode that can convert the combined optical signal 24 into a corresponding electrical signal, which can be employed as an input to a network port.

In one example, the optical slab 4 along with the WDM filters 18 and 22 and the broadcast filters 36 and 38 can be fabricated from a stack of wafers. Thus, different thicknesses of the stack can adjust the transmission frequency of the WDM filters 18 and 22 and/or the fraction of the power of the combined optical signal 24 transmitted by the broadcast filters 36 and 38. Thus, in some examples, WDM filters 18 and 22 and the broadcast filters 36 and 38 can be etched from the stack of wafers. In other examples, the optical slab 4, the WDM filters 18 and 22 and the broadcast filters 36 and 38 can be fabricated separately. In such a situation, the WDM filters 18 and 22 and the broadcast filters 36 and 38 can be positioned and adhered to the optical slab 4 (e.g., by an optical adhesive having an appropriate index of refraction).

By combining the WDM multiplexer 6 and the broadcaster 28 onto the same optical slab 4, a high bandwidth (e.g., about 40 gigabits per second) optical engine 2 can be achieved. Additionally, since a zigzag beam shape is maintained throughout the body of the optical slab 4 through the reflective coating and relay design, the optical engine 2 has a very low loss.

Figure 2:
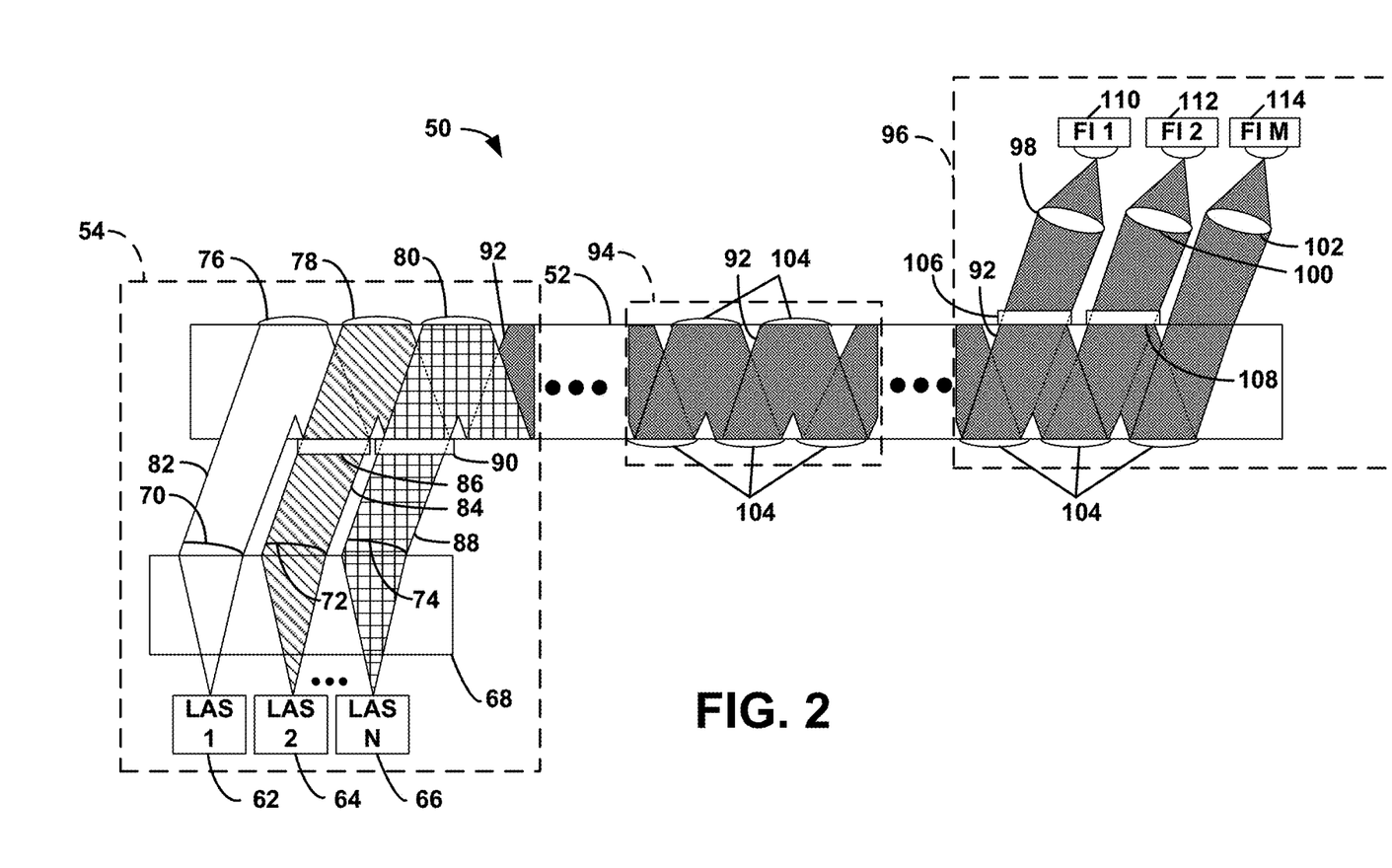
FIG. 2 illustrates another example of an optical engine that combines WDM with broadcast communication.

FIG. 2 illustrates an example of the optical engine 50 that could be employed as the optical engine 2 illustrated in FIG. 1. The optical engine 50 can include an optical slab 52. The optical slab 52 could be implemented, for example as a rigid substrate of an optically transmissive material (e.g., a slab). The optical slab 52 can be coated with the reflective coating, such as a dielectric material for a metal. As discussed herein, specific regions of the optical slab 52 can be free of such reflective material.

The optical engine 50 can include a WDM multiplexer 54. The WDM multiplexer 54 employs WDM to multiplex N number of optical signals onto the optical slab 52 by employing different wavelengths (e.g., different colors) of laser light. The WDM multiplexer 54 can receive an optical signal from N number of light emitting devices 62, 64 and 66. Each light emitting device 62, 64 and 66 can be implemented, for example by a laser. The laser could be implemented, for example, as a VCSEL. In some examples, each light emitting device 62, 64 and 66 can provide an optical signal with a wavelength between about 800 nm to about 1100 nm. Moreover, each light emitting device 62, 64 and 66 can have a channel spacing of at least 10 nm. Each light emitting device 62, 64 and 66 can provide an optical signal at a specific wavelength to a lens block 68. The lens block 68 can be formed, for example from a transmissive and/or transparent material, such as glass, plastic or the like. The lens block 68 can include N number of half lenses 70, 72 and 74 mounted thereon for redirecting light. Additionally, the optical slab 52 can include N number of beam shaping mirrors 76, 78 and 80 mounted thereon to further shape and direct light beams to propagate in the optical slab 52 in a zigzag manner. The beam shaping mirrors 76, 78 and 80 could be implemented, for example, as curved mirrors.

A first light emitting device 62 can emit a first optical signal 82 into the lens block 68. The lens block 68 can transmit the first optical signal 82 to a first half lens 70 of the N number of half lenses 70, 72 and 74. The first half lens 70 can redirect the first optical signal 82 at an input angle (e.g., about 6° to about 8°) and toward a region of the optical slab 52 that is not coated by the reflective coating. The first optical signal 82 can be transmitted into the optical slab 52 at an acute angle (e.g., about 6° to about 8°), which angle can be referred to as an input angle. The first optical signal 82 can be reflected by a first of the N number of beam shaping mirrors 76 mounted on the optical slab 52.

A second light emitting device 64 can emit a second optical signal 84 that has a wavelength separated from the first optical signal 82 by the channel spacing. The second optical signal 84 can be transmitted through the lens block 68 and into a second half lens 72 of the N number of half lenses 70, 72 and 74. The second half lens 72 can redirect the second optical signal 84 in a manner similar to the first half lens 70 and direct the second optical signal 84 into a region of the optical slab 52 that is not coated with the reflective material, but instead is covered with a WDM filter 86 associated with the second optical signal 84. The WDM filter 86 associated with the second optical signal 84 transmits light at a wavelength of the second optical signal 84 and reflects other wavelengths. Thus, the WDM filter 86 can be fabricated and positioned on the optical slab 52 to transmit the second optical signal 84 into the optical slab 52 at the input angle and to reflect the first optical signal 82, such that the first and second optical signals 82 and 84 are propagated through the optical slab 52. The second optical signal 82 can be combined with the first optical signal 82 and propagated through the optical slab 52 to reflect off a second beam shaping mirror 78 of the N number of beam shaping mirrors 76, 78 and 80.

The Nth light emitting device 66 can emit an Nth optical signal 88 that has a wavelength separated from a preceding optical signal (e.g., optical signal N−1) by the channel spacing. The Nth optical signal 88 can be transmitted through the lens block 68 and redirected to the input angle by an Nth half lens 74 of the N number of half lenses 70, 72 and 74 and transmitted toward a WDM filter 90 associated with the Nth optical signal 88. The WDM filter 90 associated with the Nth optical signal 88 can be similar to the WDM filter 86 associated with the second optical signal 84. That is, the WDM filter 90 associated with the Nth optical signal 88 transmits signals with a wavelength of the Nth optical signal 88 while reflecting other signals (e.g., including the first to N−1 optical signals). Thus, the WDM filter 90 associated with the Nth optical signal 88 can be fabricated and positioned on the optical slab 52 to transmit the Nth optical signal 88 into the optical slab 52 at the input angle and to reflect the first to N−1 optical signals 82 and 84, such that the first to Nth optical signals 82, 84 and 88 are propagated through the optical slab 52. The first to Nth optical signals 82, 84 and 88 can be propagated as a combined optical signal 92 through the optical slab 52 with a zigzag beam shape.

A propagation region 94 of the optical slab 52 can carry the combined optical signal 92 from the WDM multiplexer 54 to a broadcaster 96 of the optical engine 50 while maintaining the zigzag beam shape for the combined optical signal 92. The broadcaster 96 can receive the combined optical signal 92 and distribute the combined optical signal 92 to M number of collimating lenses 98, 100 and 102, where M is an integer greater than one (e.g., 2-10). In some examples, the broadcaster 96 and the propagation region 94 of the optical slab 52 can include relay lenses 104 positioned through the optical slab 52 to reduce divergence-induced loss. The relay lenses 104 can be broadband lenses that reflect light beams at a relay angle, which relay angle can be substantially equal to the input angle.

The broadcaster 96 of the optical engine 50 can be fabricated such that the combined optical signal 92 is received at a first broadcast filter 106 at an output angle, which output angle can be substantially equal to the input angle. The first broadcast filter 106 could be implemented as a dielectric or a metallic partial reflector, a grating or the like. The first broadcast filter 106 can be configured to transmit a fraction of power of the combined optical signal 92 to a corresponding first collimating lens 98 of the M number of collimating lenses 98, 100 and 102 and reflect the remaining fraction of power of the combined optical signal 92. The first broadcast filter 106 can be a broadband filter. In a similar fashion, the fraction of the remaining combined optical signal 92 can be received by a second broadcast filter 108. The second broadcast filter 108 can be configured to transmit another fraction of power of the combined optical signal 92 to a corresponding second collimating lens 100 of the M number of collimating lenses 98, 100 and 102 and reflect the remaining fraction of power of the combined optical signal 92. The third to M−1 broadcast filters (not shown) can be fabricated and positioned on the optical slab 52 in a similar manner. It is noted that no Mth broadcast filter is needed in some examples. Instead, in some examples, the fraction of power of the combined optical signal 92 remaining after the M−1 broadcast filter can be transmitted from the optical slab 52 to a corresponding Mth collimating lens 102 of the M number of collimating lenses 98, 100 and 102 at a region of the optical slab 52 that is not covered by the reflective coating. In one example, the fraction of power of the combined optical signal 92 reflected by the first to M−1 broadcast filters 106 and 108 (broadcast filter X) can be determined from Equation 1.

Each of the M number of collimating lenses 98, 100 and 102 can couple light to a corresponding fiber-optic cable 110, 112 and 114. In some examples, the fiber-optic cables 110, 112 and 114 can be coupled to an input port of a network interface card for conversion to electrical signals.

Figure 3:
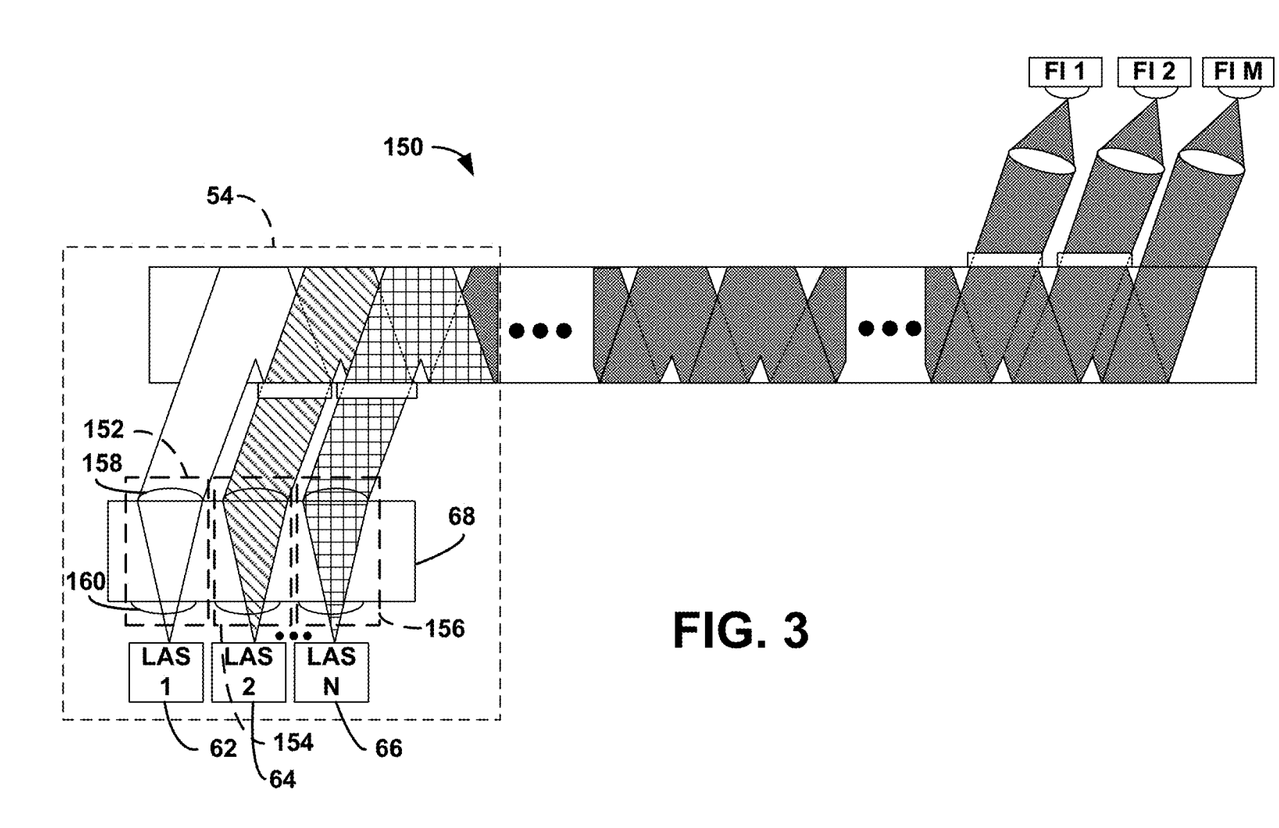
FIG. 3 illustrates yet another example of an optical engine that combines WDM with broadcast communication.

FIG. 3 illustrates another example of an optical engine 150 that could be employed as the optical engine 2 illustrated in FIG. 1. The optical engine 150 of FIG. 3 is similar to the optical engine 50 of FIG. 2 except instead of the half lenses 70, 72 and 74 illustrated in the example of FIG. 2, the WDM multiplexer 54 illustrated in FIG. 3 includes a pair of lenses 152, 154 and 156 mounted on the lens block 68 for each optical signal transmitted from first to N light emitting devices 62, 64 and 66. For purposes of simplification of explanation, FIGS. 2 and 3 employ the same reference numbers to indicate the same structures. Each pair of lenses 152, 154 and 156 can collimate and angle light beams to an input angle transmitted from a corresponding light emitting device 62, 64 and 66. An upper lens 158 and a lower lens 160 for a given pair of lenses 152, 154 and 156 can mounted on opposing sides of the lens block 68. Moreover, the input angle can be varied based on an offset of the upper lens 158 and the lower lens 160 for a given pair of lenses 152, 154 and 156.

Figure 4:
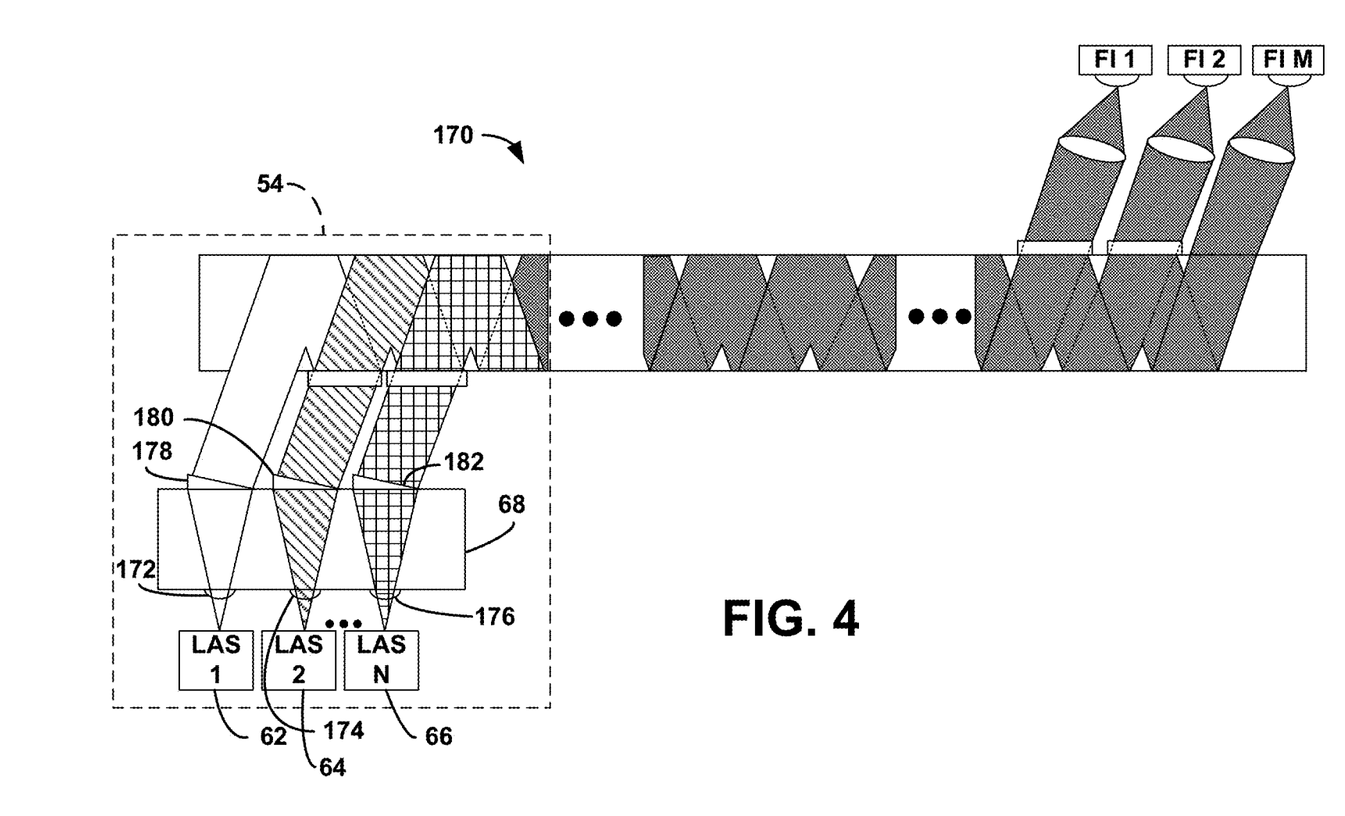
FIG. 4 illustrates a further example of an optical engine that combines WDM with broadcast communication.

FIG. 4 illustrates another example of an optical engine 170 that could be employed as the optical engine 2 illustrated in FIG. 1. The optical engine 150 of FIG. 4 is similar to the optical engine 50 of FIG. 2 except instead of the half lenses 70, 72 and 74 illustrated in the example of FIG. 2, the WDM multiplexer 54 illustrated in FIG. 4 includes collimating lenses 172, 174 and 176 mounted on a given side of the lens block 68 and prisms 178, 180 and 182 mounted on an opposing side of the lens block 68. For purposes of simplification of explanation, FIGS. 2 and 4 employ the same reference numbers to indicate the same structures. Each collimating lens 172, 174 and 176 can collimate light beams provided from a corresponding light emitting device 62, 64 and 66. Each collimating lens 172, 174 and 176 can be centered about a light beam emitted from the corresponding light emitting device 62, 64 and 66. Light transmitted from the collimating lens 172, 174 and 176 can be received by a corresponding prism 178, 180 and 182 that can tilt the collimated light to an input angle. Each of the prisms 178, 180 and 182 could be implemented, for example, as triangular prisms. Moreover, the input angle can be varied based on the dimensions of the prisms 178, 180 and 182.

Figure 5:
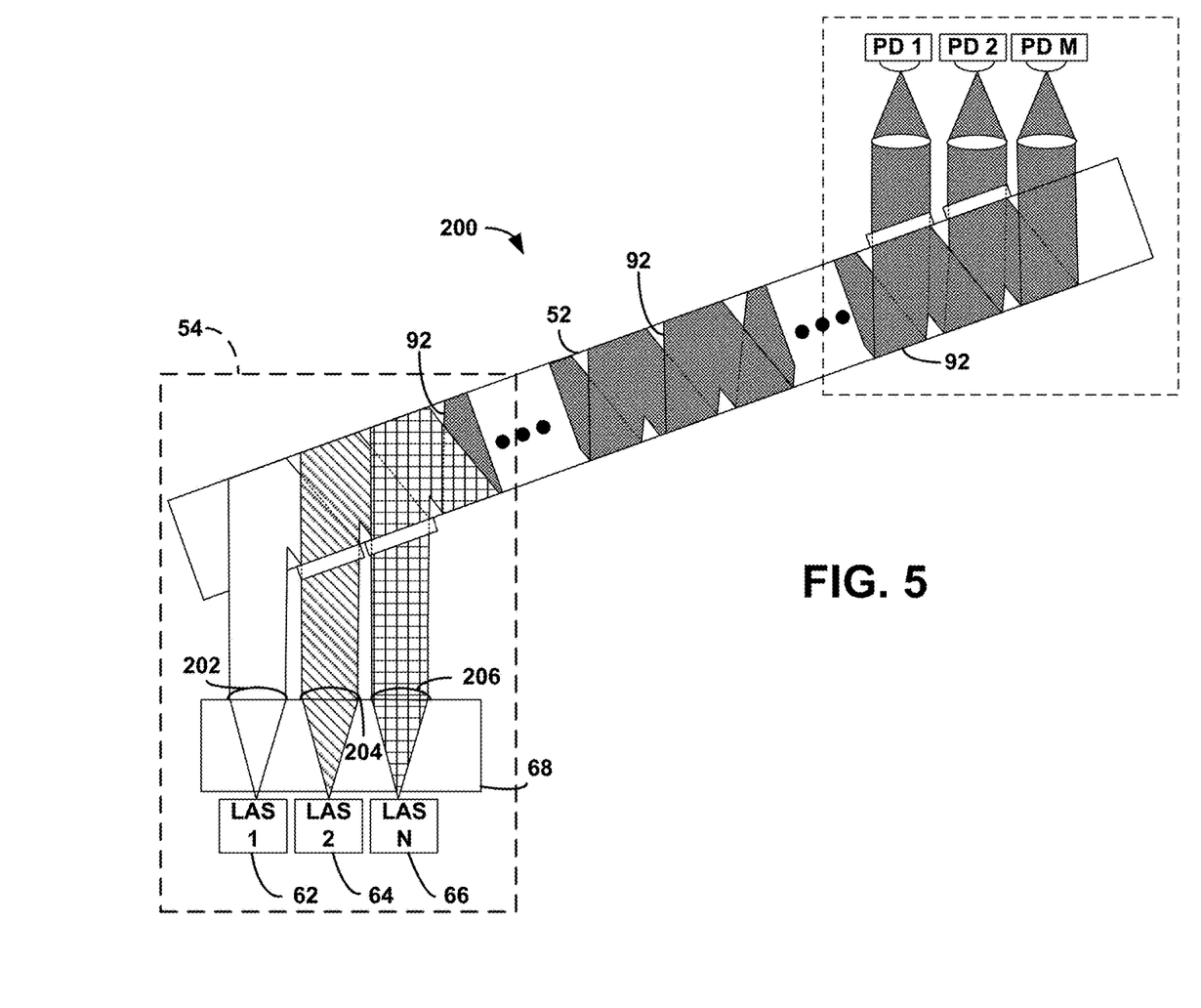
FIG. 5 illustrates still yet another example of an optical engine that combines WDM with broadcast communication.

FIG. 5 illustrates yet another example of an optical engine 200 that could be employed as the optical engine illustrated in FIG. 1. The optical engine 200 of FIG. 4 is similar to the optical engine of FIG. 2 except instead of the half lenses 70, 72 and 74 illustrated in the example of FIG. 2, the WDM multiplexer 54 illustrated in FIG. 5 includes a collimating lens 202, 204 and 206 mounted on the lens block 68 for each optical signal transmitted from the first to Nth light emitting devices 62, 64 and 66. For purposes of simplification of explanation, FIGS. 2 and 5 employ the same reference numbers to indicate the same structures. Each collimating lens 202, 204 and 206 can transmit light beam in a direction normal to the lens block 68. Each of the collimating lenses 202, 204 and 206 could be implemented, for example, as a micro-lens. Moreover, the optical slab 52 can be offset by an input angle (e.g., about 6° to about 8°) relative to the lens block 68 to ensure proper propagation of light beams through the optical slab. In a similar manner, fractions of the combined optical signal 92 can exit the optical slab 52 in a direction normal to the lens block 68.

Figure 6:
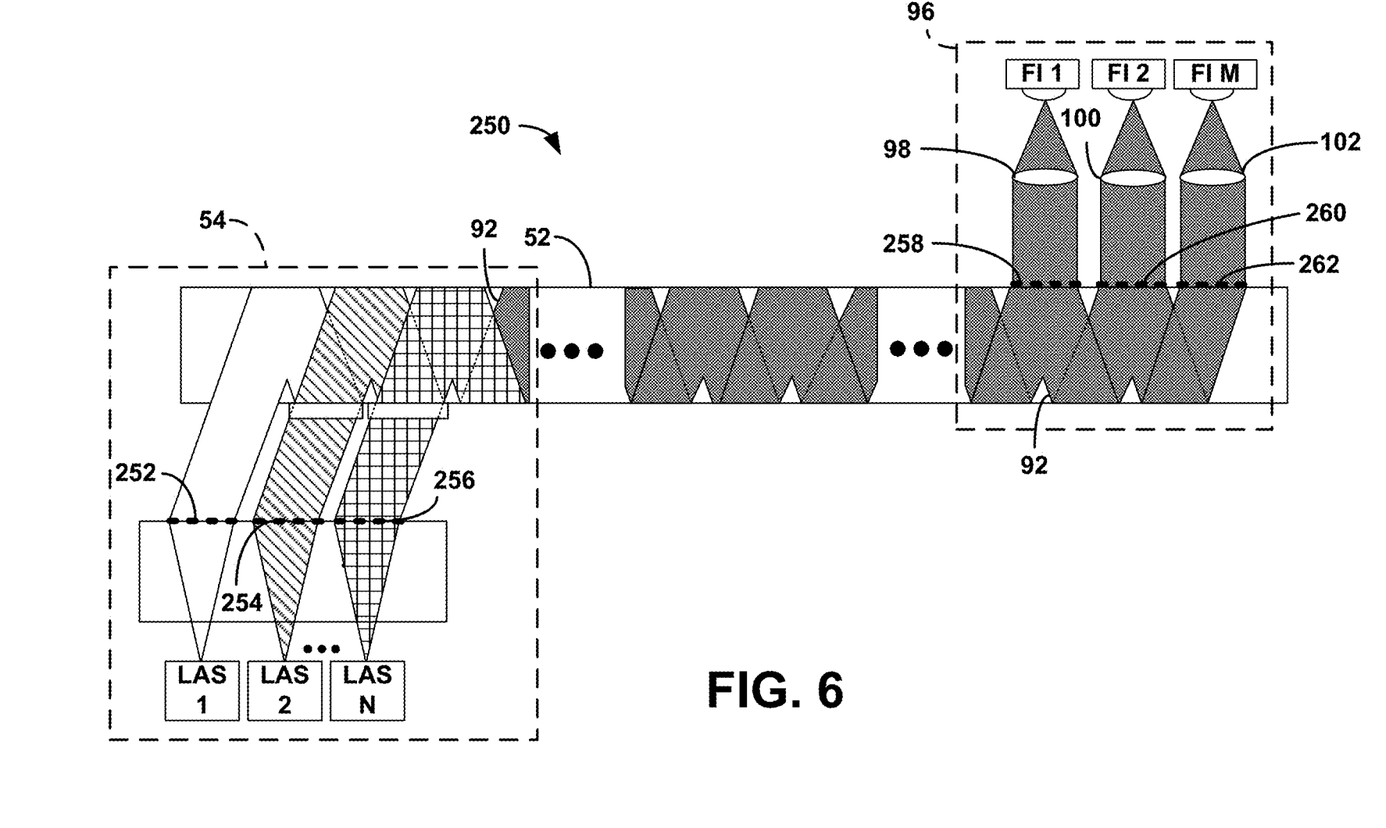
FIG. 6 illustrates yet still another example of an optical engine that combines WDM with broadcast communication.

FIG. 6 illustrates yet another example of an optical engine 250 that could be employed as the optical engine 2 illustrated in the example of FIG. 1. The optical engine 250 of FIG. 6 is similar to the optical engine 50 of FIG. 2 except that instead of the half lenses 70, 72 and 74 and broadcast filters 106 and 108 illustrated in FIG. 2, the WDM multiplexer 54 illustrated in FIG. 6 includes N number of WDM gratings 252, 254 and 256 overlaying the lens block 68. The WDM gratings 252, 254 and 256 can be implemented, for example, as a high contrast gratings, such as gratings with an index of refraction of about 3 or more (e.g., at least about 3.5). For purposes of simplification of explanation, FIGS. 2 and 6 employ the same reference numbers to indicate the same structures. Each of the WDM gratings 252, 254 and 256 can split, collimate and redirect light output by a corresponding light source. Additionally, M number of broadcast gratings 258, 260 and 262 can be employed by the broadcaster 96 to distribute the combined optical signal 92 to M number of collimating lenses 98, 100 and 102. Each of the broadcast gratings 258, 260 and 262 can split and redirect the combined optical signal 92 signal to a corresponding collimating lens 98, 100 or 102. The broadcast gratings 252, 254 and 256 can be implemented as high contrast gratings, such as gratings with an index of refraction of about 3 or more (e.g., at least about 3.5). In some examples, the broadcast gratings 258, 260 and 262 can output the combined optical signal 92 in a direction normal to a face of the optical slab 52. Each of the input and broadcast gratings 252, 254, 256, 258, 260 and 262 can be formed from a dielectric material. Moreover, employment of the WDM and/or broadcast gratings 252, 254, 256, 258, 260 and 262 provide significant control of the input and output angles.

Figure 7:
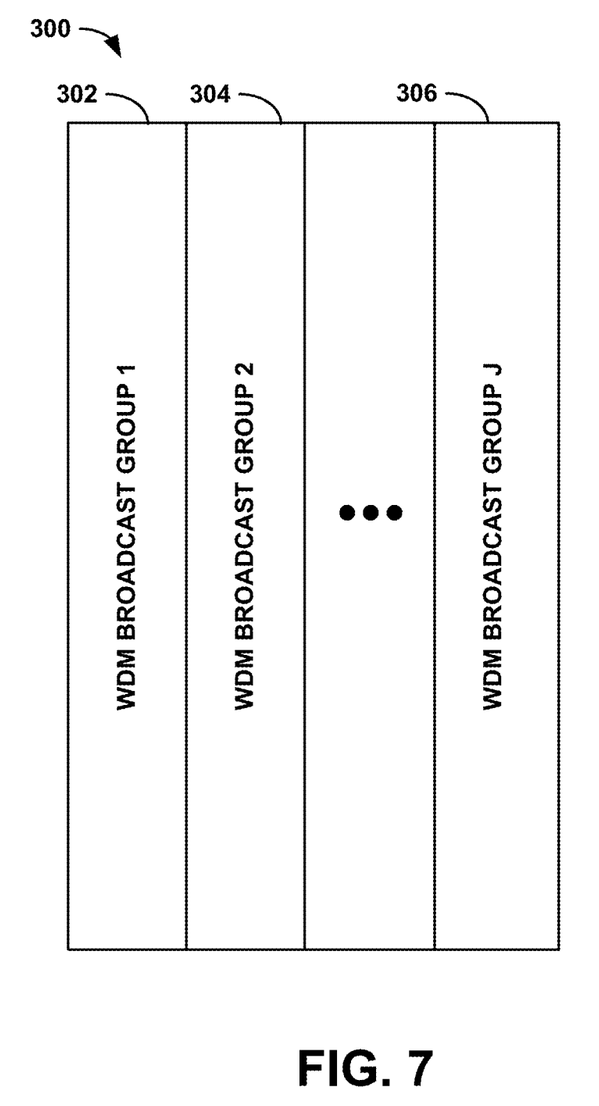
FIG. 7 illustrates an array of WDM-broadcasting groups.

FIG. 7 illustrates an example of an optical engine 300 with J number of WDM-broadcast groups 302, 304 and 306, where J is an integer greater than one. Each of the J number of WDM-broadcast groups 302, 304 and 306 could be implemented in a manner similar to the optical engines 2, 50, 150, 200 and 250 illustrated in FIGS. 1-5. Moreover, each of the J number of WDM-broadcast groups 302, 304 and 306 can be mounted on a common optical slab that can be implemented as a rigid slab. Each of the J number of WDM-broadcast groups 302, 304 and 306 can be separated by a distance of about 250 µm or more. In this manner, combined optical signals propagated by each of the J groups of WDM-broadcast groups 302, 304 and 306 can propagate through the common optical slab with substantially parallel paths. By employment of the optical engine 300, significant space savings can be achieved.

Figure 8:
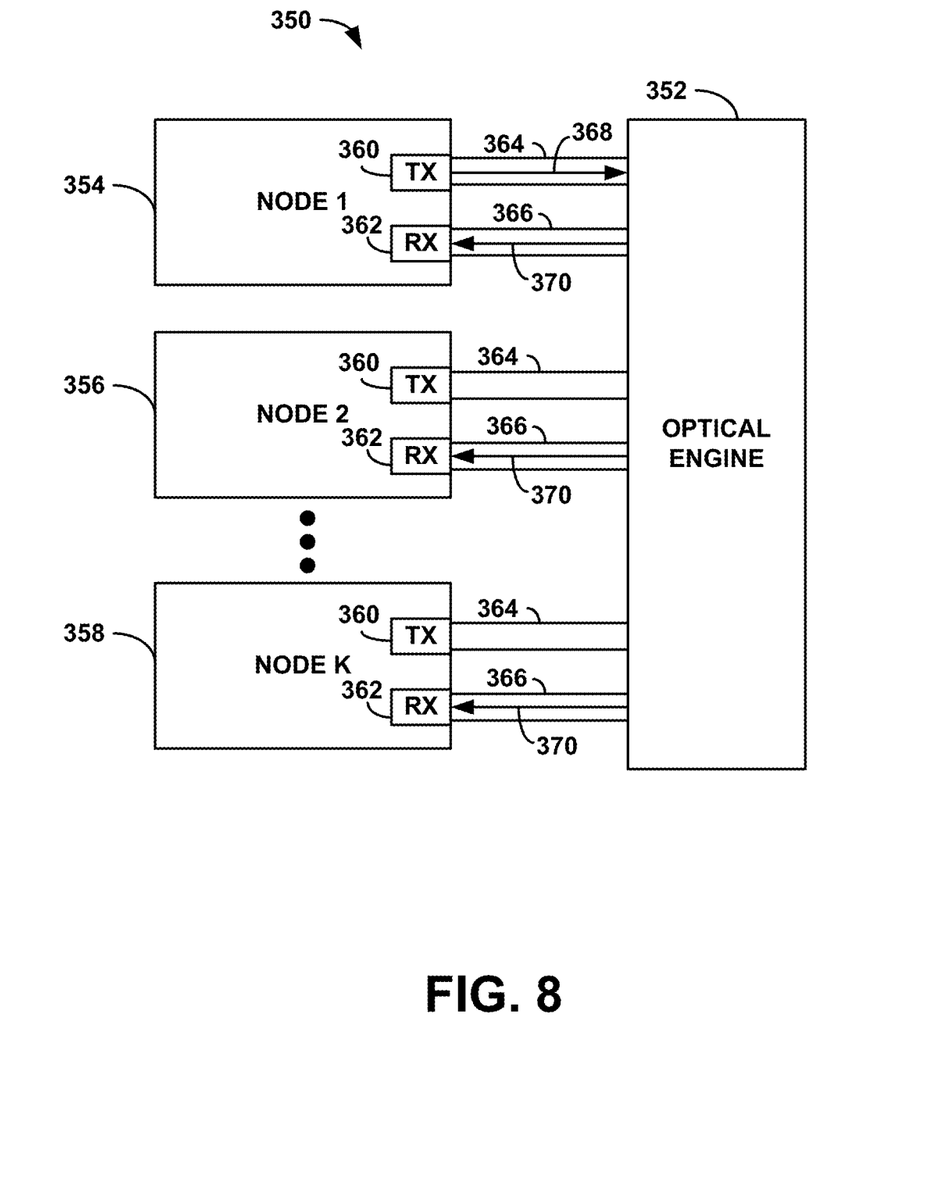
FIG. 8 illustrates an example of a system that employs an optical engine.

FIG. 8 illustrates an example of a system 350 that could employ an optical engine 352, such as the optical engine 2, 50, 150, 200, 250 and 300 illustrated in FIGS. 1-6. The system 350 could be implemented, for example, in a data center rack. The system 350 includes K number of nodes 354, 356 and 358, wherein K is an integer greater than two. Each of the K number of nodes 354, 356 and 358 could represent, for example, a blade server computer. Each of the K number of nodes 354, 356 and 358 can include a transmitter 360 and a receiver 362. In some examples, each receiver 362 can be representative of at least K−1 number of receivers. Each transmitter 360 and receiver 362 can be implemented as fiber-optic ports. Additionally, each transmitter 360 and receiver 362 can communicate on a corresponding input and output fiber-optic cables 364 and 366. It is noted that while input and output fiber-optic cables 364 and 366 are illustrated as being separate cables, in other examples, the input and output fiber-optic cables 364 and 366 could be integrated into a single cable.

The first node 354 of the N number of nodes 354, 356 and 358 can transmit an input optical signal 368 that could be comprised of a plurality of optical signals, such as the first through Nth optical signals 14, 16 and 20 illustrated in FIG. 1. The optical engine 352 can combine the plurality of optical signals that comprise the input signal to form a combined optical signal 370. The optical engine 352 can broadcast a fraction of the combined optical signal 370 to each of the K number of nodes 354, 356 and 356. In this manner, a high speed, low loss communication between the K number of nodes 354, 356 and 358 can be implemented.

Figure 9:
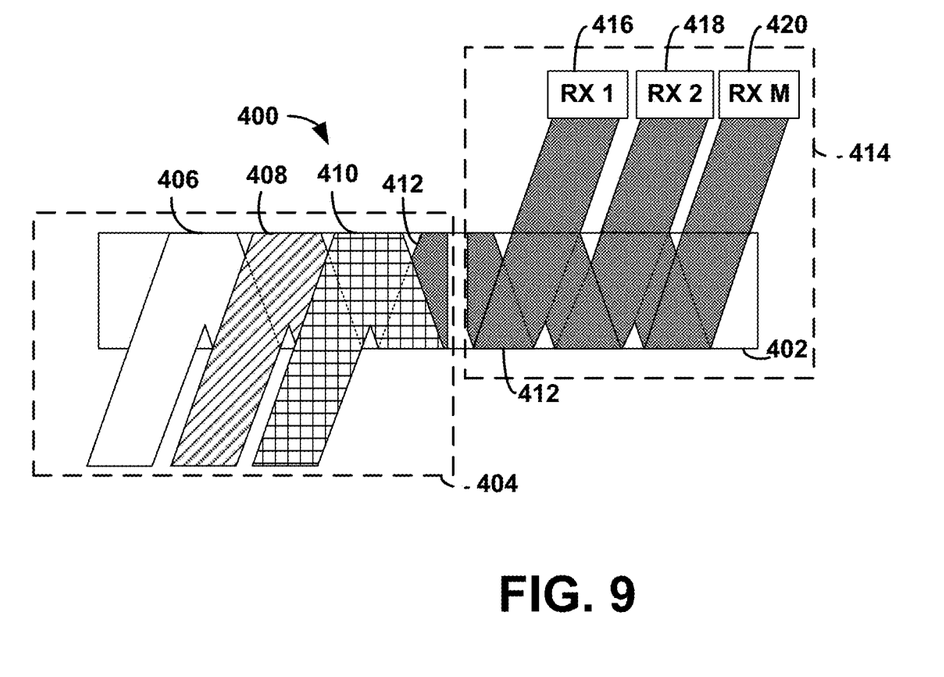
FIG. 9 illustrates another example of an optical engine.

FIG. 9 illustrates an example of an optical engine 400. The optical engine 400 can comprise an optical slab 402 comprising a rigid substrate of substantially transmissive material. The optical engine 400 can also comprise a WDM multiplexer 404 to receive and combine a plurality of optical signals 406, 408 and 410 at different wavelengths to form a combined optical signal 412 in the optical slab 402 having an aggregate power. The optical engine 400 can further comprise a broadcaster 414 to distribute a fraction of the combined optical signal 412 from the optical slab 402 to a plurality of different optical receivers 416, 418 and 420 with a fraction of the aggregate power of the combined optical signal 412.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. An apparatus comprising:
an optical slab comprising a rigid substrate of optically transmissive material and having at least a portion of the optical slab coated with a reflective coating;
a first wave division multiplexing (WDM) multiplexing group that includes:
a first WDM multiplexer to receive and combine a first plurality of optical signals of different wavelengths to form a first combined optical signal in the optical slab having a first aggregate power, and
a first broadcaster to distribute the first combined optical signal from the optical slab to a first plurality of optical receivers, each of the first plurality of optical receivers to receive a fraction of the first aggregate power of the first combined optical signal; and a second WDM group that includes:
a second WDM multiplexer to receive and combine a second plurality of optical signals of different wavelengths to form a second combined optical signal in the optical slab having a second aggregate power, and a second broadcaster to distribute the second combined optical signal from the optical slab to a second plurality of optical receivers, each of the second plurality of optical receivers to receive a fraction of the second aggregate power of the second combined optical signal, wherein the reflective coating of the optical slab maintains each of the first combined optical signal and the second combined optical signal in zigzag beam shapes through the optical slab from the first WDM multiplexer to the first broadcaster and from the second WDM multiplexer to the second broadcaster, respectively, and wherein the first combined optical signal and the second combined optical signal are to propagate through the optical slab in parallel paths.

2. The apparatus of claim 1, wherein the first WDM multiplexer receives the first plurality of optical signals from a first node of a plurality of computing nodes.

3. The apparatus of claim 1, wherein the first plurality of optical receivers belongs to a respective computing nodes, and each of the respective computing nodes receives the fraction of the first aggregate power of the first combined optical signal.

4. The apparatus of claim 1, wherein the first WDM group and the second WDM group are separated by at least 250 μm.

5. The apparatus of claim 1, wherein the first combined optical signal and the second combined optical signal are to propagate through the optical slab at an angle of 6° to 8° relative to an interior sidewall of the optical slab.

6. The apparatus of claim 1, wherein the first WDM multiplexer includes a plurality of WDM filters mounted on the optical slab, each of the plurality of WDM filters to transmit light at a given wavelength therethrough and to reflect light at a wavelength other than the given wavelength into the optical slab.

7. The apparatus of claim 1, wherein each of the first broadcaster includes a plurality of broadcast filters mounted on the optical slab, each broadcast filter to transmit the fraction of the first aggregate power of the first combined optical and to reflect a remaining portion of power of the first combined optical signal.

8. The apparatus of claim 1, wherein the first WDM multiplexer includes a lens block to receive the first plurality of optical signals at a first side of the lens block and to transmit the plurality of optical signals at second side of the lens block opposite the first side, the second side being nearer to the optical slab than the first side.

9. The apparatus of claim 8, further comprising a plurality of half-lenses mounted on the lens block to redirect optical signals in a given direction at an input angle into the optical slab.

10. The apparatus of claim 8, further comprising a plurality of lens pairs mounted on the lens block,
wherein a first lens in a lens pair of the plurality of lens pairs is to collimate an optical signal of the first plurality of optical signals into a collimated optical signal, a second lens in the lens pair is to redirect the collimated optical signal from the first lens at an input angle into the optical slab, and the first lens is mounted on the first side of the lens block, and the second lens is mounted on the second side of the lens block and is offset axially relative to the first lens.

11. The apparatus of claim 8, further comprising a plurality of micro-lenses mounted on the lens block, each micro-lens to collimate a respective optical signal of the first plurality of optical signals and transmit a respective collimated optical signal into the optical slab in a direction normal to the first side of the lens block and the second side of the lens block,
wherein the optical slab is at an angle relative to the first side of the lens block and the second side of the lens block.

12. The apparatus of claim 8, further comprising:
a first plurality of high contrast gratings mounted on the lens block to direct the first plurality of optical signals to the optical slab at an input angle, the first plurality of high contrast gratings forming part of the first WDM multiplexer; and a second plurality of high contrast gratings mounted on the optical slab to redirect and distribute the first combined optical signal to the first plurality of optical receivers at an angle normal to a side of the optical slab, the second plurality of high contrast gratings forming part of the first broadcaster.

13. The apparatus of claim 8, further comprising:
a plurality of collimating lenses mounted on the first side of the lens block; and
a plurality of prisms mounted on the second side of the lens block, wherein a collimating lens of the plurality of collimating lenses is to collimate an optical signal of the first plurality of optical signals into a collimated optical signal, and a corresponding prism of the plurality of prisms is to direct the collimated optical signal in at an input angle into the optical slab.

14. An apparatus comprising:
an optical slab comprising a rigid substrate of optically transmissive material;
a wave division multiplexing (WDM) multiplexer at the optical slab to receive and combine a plurality of optical signals of different wavelengths to form a combined optical signal in the optical slab having an aggregate power; and
a broadcaster at the optical slab to distribute a fraction of the aggregate power of the combined optical signal from the optical slab to each of a plurality of optical receivers, the broadcaster being separated from the WDM multiplexer by a propagation region of the optical slab,
wherein at least a portion of the optical slab is coated with reflective material to maintain the optical signals in a zigzag beam shape through the optical slab from the WDM multiplexer to the broadcaster.

15. The apparatus of claim 14, further comprising a plurality of light sources of different wavelengths to transmit respective ones of the plurality of optical signals.

16. The apparatus of claim 14, wherein the broadcaster includes a plurality of collimating lenses to collimate the fraction of the aggregate power of the combined optical signal to each of the plurality of optical receivers.

17. The apparatus of claim 14, wherein the optical slab includes relay lenses to reflect the zigzag beam shape to reduce divergence-induced loss.

* * * * *